(12) United States Patent
Ishizaki et al.

(10) Patent No.: US 9,640,326 B2
(45) Date of Patent: May 2, 2017

(54) SOLID ELECTROLYTIC CAPACITOR

(71) Applicant: Panasonic Intellectual Property Management Co., Ltd., Osaka (JP)

(72) Inventors: Katsuhisa Ishizaki, Kyoto (JP); Kouta Muneyasu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 72 days.

(21) Appl. No.: 14/416,276

(22) PCT Filed: Sep. 5, 2013

(86) PCT No.: PCT/JP2013/005256
§ 371 (c)(1),
(2) Date: Jan. 21, 2015

(87) PCT Pub. No.: WO2014/038203
PCT Pub. Date: Mar. 13, 2014

(65) Prior Publication Data
US 2015/0262759 A1  Sep. 17, 2015

(30) Foreign Application Priority Data

Sep. 10, 2012 (JP) ................................. 2012-198225

(51) Int. Cl.
*H01G 9/15* (2006.01)
*H01G 9/012* (2006.01)
(Continued)

(52) U.S. Cl.
CPC .............. *H01G 9/15* (2013.01); *H01G 9/012* (2013.01); *H01G 9/048* (2013.01); *H01G 9/10* (2013.01); *H01G 9/14* (2013.01)

(58) Field of Classification Search
CPC ............ H01G 9/15; H01G 9/14; H01G 9/048; H01G 9/10; H01G 9/012
See application file for complete search history.

(56) References Cited

U.S. PATENT DOCUMENTS 3,588,628 A * 6/1971 Peck ...................... H01G 9/012
257/735
4,539,623 A * 9/1985 Irikura ................... H01G 9/012
29/25.03
(Continued)

FOREIGN PATENT DOCUMENTS

JP 62150814 A * 7/1987
JP 1-104717 U 7/1989
(Continued)

OTHER PUBLICATIONS

International Search Report of PCT application No. PCT/JP2013/005256 dated Oct. 1, 2013.

*Primary Examiner* — David M Sinclair
(74) *Attorney, Agent, or Firm* — McDermott Will & Emery LLP

(57) ABSTRACT

A solid electrolytic capacitor includes a capacitor element, a negative terminal, a positive terminal, and a resin package covering the capacitor element. The negative terminal and the positive terminal are joined respectively to a negative electrode section and a positive electrode section of the capacitor element. The negative terminal has a mount portion, a protruding portion, and a collecting portion. The mount portion has the negative electrode section disposed thereon, and is joined to an underside of the negative electrode via a conductive bonding portion. The protruding portion protrudes from a side edge of the mount portion in a same plane as the mount portion, and has a width narrowed stepwise in a protruding direction. The collecting portion is provided adjacent to a side edge of a part where the
(Continued)

protruding portion is narrowed stepwise, and accommodates a part of the conductive bonding portion.

2 Claims, 4 Drawing Sheets

(51) Int. Cl.
*H01G 9/10* (2006.01)
*H01G 9/048* (2006.01)
*H01G 9/14* (2006.01)

(56) References Cited

U.S. PATENT DOCUMENTS

| | | | | |
|---|---|---|---|---|
| 6,236,561 | B1* | 5/2001 | Ogino | H01G 9/012 361/301.3 |
| 6,972,943 | B2* | 12/2005 | Kato | H01G 9/012 257/E23.043 |
| 2006/0077618 | A1* | 4/2006 | Fujii | H01G 2/065 361/534 |
| 2008/0002335 | A1* | 1/2008 | Kurita | H01G 9/012 361/528 |
| 2008/0232027 | A1 | 9/2008 | Ozawa et al. | |
| 2009/0147447 | A1* | 6/2009 | Matsuoka | H01G 9/012 361/540 |
| 2009/0147449 | A1* | 6/2009 | Matsuoka | H01G 9/012 361/540 |
| 2011/0292573 | A1* | 12/2011 | Naito | H01G 9/012 361/528 |
| 2013/0222977 | A1* | 8/2013 | Kawahito | H01G 9/028 361/523 |
| 2013/0329341 | A1* | 12/2013 | Kurita | H01G 9/012 361/502 |

FOREIGN PATENT DOCUMENTS

| | | |
|---|---|---|
| JP | 10-050554 | 2/1998 |
| JP | 2001-110676 | 4/2001 |
| JP | 2006-190925 | 7/2006 |
| JP | 2006-269865 | 10/2006 |
| JP | 2008-235413 | 10/2008 |

\* cited by examiner

SOLID ELECTROLYTIC CAPACITOR

CROSS-REFERENCE TO RELATED APPLICATIONS

The present application is a U.S. national stage application of PCT International Application No. PCT/JP2013/005256 filed on Sep. 5, 2013, and claims the benefit of foreign priority to Japanese patent application 2012-198225 filed on Sep. 10, 2012, the contents all of which are incorporated by reference.

TECHNICAL FIELD

The present invention relates to a solid electrolytic capacitor that has a capacitor element and a pair of terminals connected to the capacitor element.

BACKGROUND ART

With a trend toward downsizing, slimming down and digitalization of electronic apparatuses, there has been a growing demand for increase in capacitances, decrease in equivalent series resistances ("ESR") and decrease in thicknesses of solid electrolytic capacitors for use in such electronic apparatuses.

FIG. 8 is a perspective see-through view of a conventional solid electrolytic capacitor. This solid electrolytic capacitor has capacitor element (hereinafter referred to as "element") 51, negative terminal 52, positive terminal 53, and resin package 54. Negative terminal 52 is connected to a negative electrode portion of element 51, and positive terminal 53 is connected to a positive electrode portion of element 51. Resin package 54 covers element 51 and parts of negative terminal 52 and positive terminal 53. Certain parts of negative terminal 52 and positive terminal 53 are exposed on side faces of resin package 54, and bent along an underside from these side faces.

In element 51, a conductive polymer having an excellent electrical conductivity is used for a solid electrolyte layer. The ESR of element 51 thus is small. In addition, a surface where a dielectric oxide film is formed is etched. Element 51 has a large capacitance as a result of increasing the surface area.

Positive terminal 53 is welded to the positive electrode portion of element 51. On the other hand, negative terminal 52 is bent into a shape of letter L to form mount portion 55 inside resin package 54. Mount portion 55 is joined to an underside of the negative electrode portion of element 51 via a conductive bonding portion (not shown) formed of an electrically conductive paste. Negative terminal 52 is also provided with holder portions 56. Each of holder portion 56 is fitted into one of recesses each formed in a side face near one end of the negative electrode of element 51, and joined to the side face of the negative electrode portion via conductive bonding portion 57. The ESR of the solid electrolytic capacitor is small by virtue of these structures (Patent Literature 1, for example).

CITATION LIST

Patent Literature

PTL 1: Japanese Patent Unexamined Publication, No. 2008-235413

SUMMARY OF THE INVENTION

A solid electrolytic capacitor of the present invention includes a capacitor element, a negative terminal, a positive terminal, and a resin package that covers the capacitor element. The negative terminal and the positive terminal are joined respectively to a negative electrode portion and a positive electrode portion of the capacitor element. The negative terminal has a mount portion, a protruding portion, and a collecting portion. The mount portion has the negative electrode portion disposed thereon, and is joined to an underside of the negative electrode portion via a conductive bonding portion. The protruding portion protrudes from a side edge of the mount portion in a same plane as the mount portion, and has a width narrowed stepwise in a protruding direction. The collecting portion is provided adjacent to a side edge of a part where the protruding portion is narrowed stepwise, and accommodates a part of the conductive bonding portion.

The collecting portion provided in this form can reduce a thickness of the conductive bonding portion that is stuck out of the negative terminal. As a result, a solid electrolytic capacitor of a large capacitance and a small ESR can thus be provided since this structure can prevent the conductive bonding portion from being exposed on a mounting surface.

DESCRIPTION OF EMBODIMENT

Figure 8:
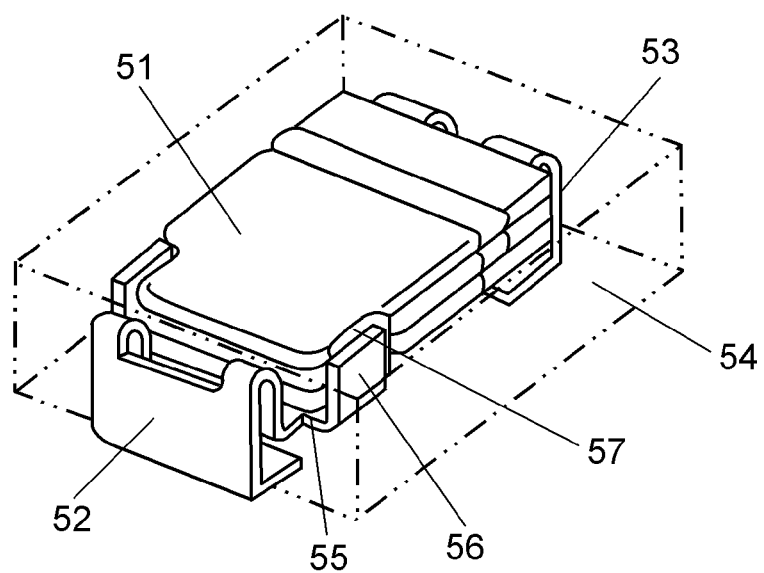
FIG. 8 is a perspective see-through view of a conventional solid electrolytic capacitor.

Prior to proceeding with details of the present exemplary embodiment, problems related to a conventional solid electrolytic capacitor shown in FIG. 8 is described. In order to increase a capacitance of this solid electrolytic capacitor, it is one of ways to improve a packaging efficiency of element 51, for instance, by thinning resin package 54. On the other hand, to ensure bonding between negative terminal 52 and the negative electrode of element 51 and to decrease the ESR, it is considered that a conductive resin is applied in a manner that a part of the conductive resin is stuck out of negative terminal 52. When resin package 54 is thinned down, however, there arises a possibility that the conductive resin stuck out of negative terminal 52 may be exposed on an underside of resin package 54, and cause the solid electrolytic capacitor to short wiring conductors on a circuit board.

Description is provided hereinafter of a solid electrolytic capacitor having large capacitance and measures to prevent the conductive resin from being exposed according to the present exemplary embodiment of the invention.

Figure 1:
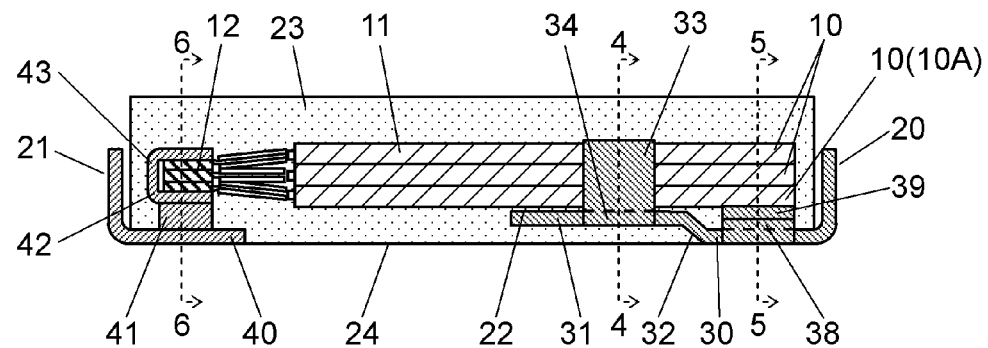
FIG. 1 is a sectional front view of a solid electrolytic capacitor according to an exemplary embodiment of the present invention.
Figure 2:
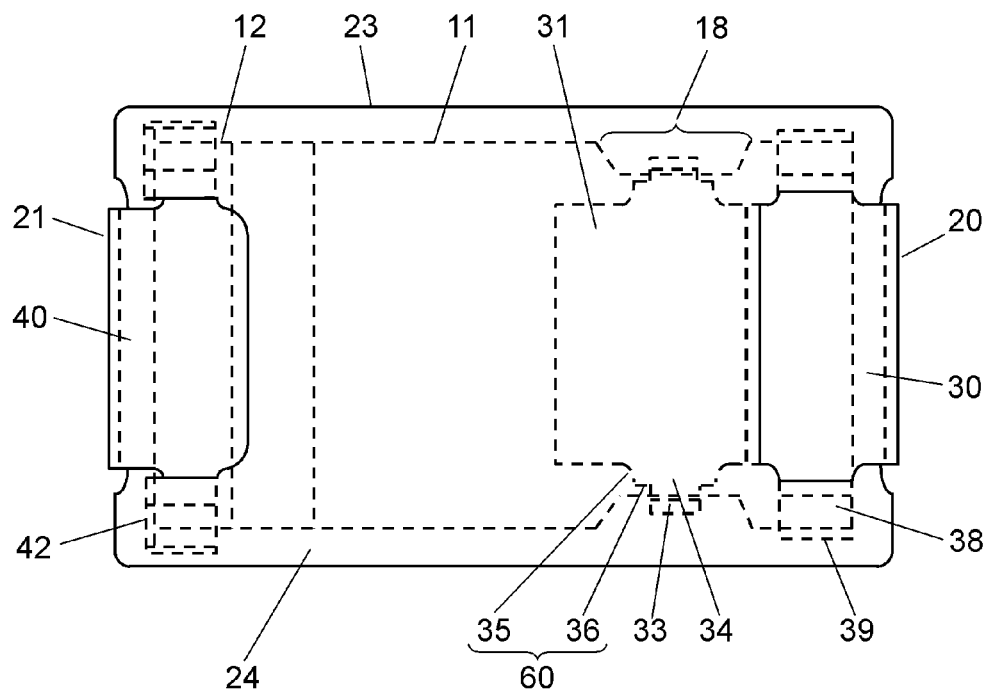
FIG. 2 is a bottom plan view of the solid electrolytic capacitor shown in FIG. 1.
Figure 3A:
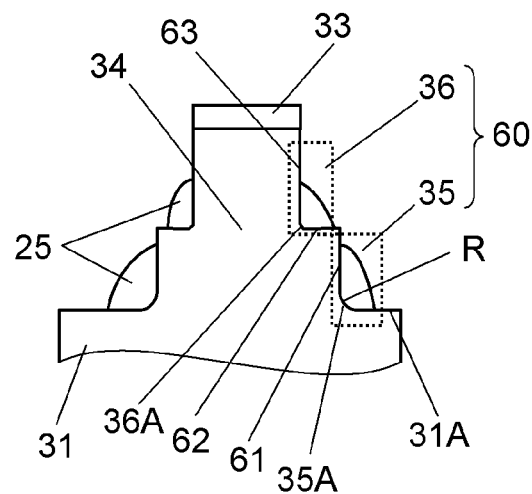
FIG. 3A is an enlarged plan view of a main portion that illustrates a conductive bonding portion accommodated in first and second collecting portions provided in a negative terminal of the solid electrolytic capacitor shown in FIG. 1.
Figure 4:
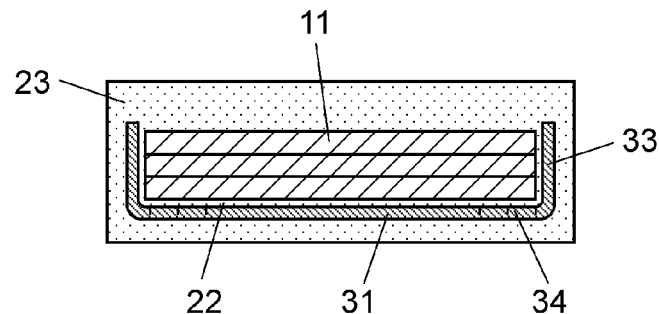
FIG. 4 is a sectional view of the solid electrolytic capacitor taken along a line 4-4 shown in FIG. 1.
Figure 5:
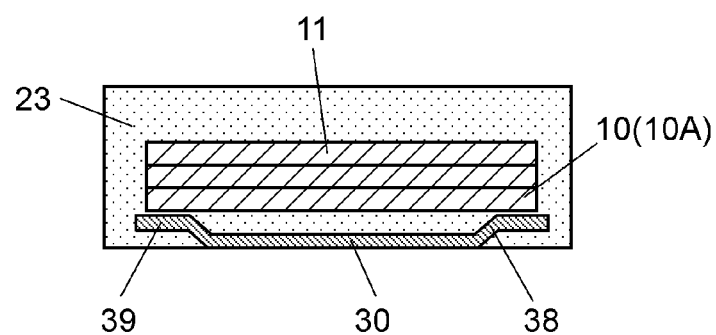
FIG. 5 is a sectional view of the solid electrolytic capacitor taken along a line 5-5 shown in FIG. 1.
Figure 6:
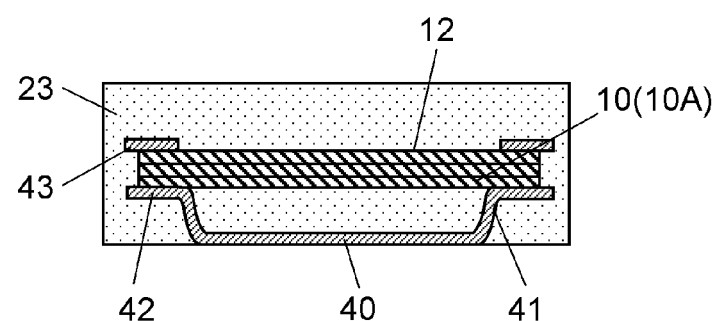
FIG. 6 is a sectional view of the solid electrolytic capacitor taken along a line 6-6 shown in FIG. 1.
Figure 7:
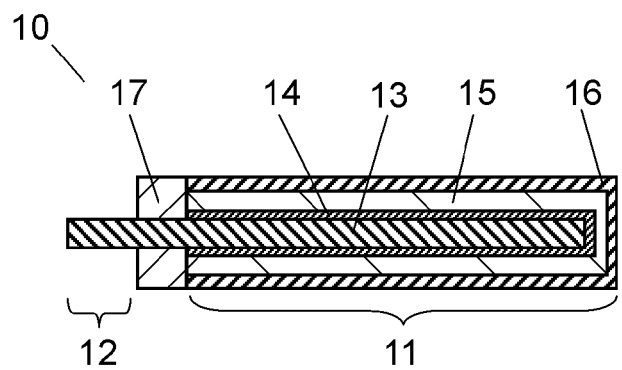
FIG. 7 is a sectional view of a capacitor element of the solid electrolytic capacitor shown in FIG. 1.

FIG. 1 and FIG. 2 are sectioned front view and bottom plan view of the solid electrolytic capacitor according to this embodiment of the present invention, respectively. FIG. 3A is an enlarged plan view of a main portion that illustrates conductive bonding portion 25 accommodated in first collecting portion 35 and second collecting portion 36 provided in negative terminal 20 of the solid electrolytic capacitor shown in FIG. 1. FIG. 4 is a sectional view of the solid electrolytic capacitor taken along a line 4-4 shown in FIG. 1, and it depicts mount portion 31. FIG. 5 is a sectional view of the solid electrolytic capacitor taken along a line 5-5 shown in FIG. 1, and it depicts support portion 38. FIG. 6 is a sectional view of the solid electrolytic capacitor taken along a line 6-6 shown in FIG. 1, and it depicts setting portion 42. FIG. 7 is a sectional view of a capacitor element (hereafter referred to as "element") 10 of the solid electrolytic capacitor shown in FIG. 1.

The solid electrolytic capacitor of this embodiment has a plurality of flat-shaped elements 10, negative terminal 20, positive terminal 21, and resin package 23. Each of elements 10 has negative electrode section 11 and positive electrode section 12. Negative terminal 20 is joined to negative electrode portions 11 that are stacked together. Positive terminal 21 is joined to positive electrode portions 12 that are also stacked together. Resin package 23 covers stacked elements 10, and parts of negative terminal 20 and positive terminal 21. Note that element 10 can be just one piece.

As shown in FIG. 7, positive electrode section 12 of element 10 is disposed at a first end of positive electrode body 13 in a form of foil made of a valve action metal of aluminum, and negative electrode 11 is disposed at a second end of positive electrode body 13 separated by insulating separator 17 disposed in a belt shape.

Any of other valve action metals such as tantalum, niobium and titanium can also be used besides aluminum. In addition, a part of positive electrode body 13 where negative electrode 11 is formed may be a porous sintered body made from powder of a valve action metal.

Negative electrode 11 portion has dielectric oxide film 14 formed on a surface of positive electrode body 13, solid electrolyte layer 15, and negative electrode layer 16. Solid electrolyte layer 15 is composed of a conductive polymer formed on dielectric oxide film 14. Negative electrode layer 16 is formed by laminating a silver paste layer on a carbon layer. Solid electrolyte layer 15 and negative electrode layer 16 are disposed in this order on dielectric oxide film 14.

As conductive polymer of solid electrolyte layer 15, polypyrrole, polythiophene, or polyaniline can be used. These kinds of polymers have high electrical conductivities, and are excellent in the ESR characteristic. Alternatively, any of manganese oxides such as manganese dioxide can also be used for solid electrolyte layer 15.

Resin package 23 is formed of an insulation resin having heat resistant property such as epoxy resin.

Negative terminal 20 and positive terminal 21 are formed of a lead frame having a base material of any metal such as copper, iron, nickel, and an alloy thereof. Negative terminal 20 and positive terminal 21 have lower sections 30 and 40, respectively, as shown in FIG. 1 and FIG. 2. Lower sections 30 and 40 are exposed on mounting face 24 of the solid electrolytic capacitor. More specifically, the undersides of lower sections 30 and 40 form a same plane with the underside of resin package 23.

As shown in FIG. 5 and FIG. 6, resin package 23 is disposed on upper faces of lower sections 30 and 40 such that resin package 23 is disposed between lower section 30 and negative electrode section 11 of element 10A located at the lowermost side among stacked elements 10. Similarly, resin package 23 is disposed between lower section 40 and positive electrode section 12 of element 10A.

As shown in FIG. 2, in mounting face 24, it is preferable that lower sections 30 and 40 are approximately rectangular in shapes, and have same mounting areas. In the following descriptions, a direction extending between positive electrode 12 and negative electrode 11 is defined as a longitudinal direction, one side closer to positive electrode 12 along the longitudinal direction is designated a positive electrode side, the other side closer to negative electrode 11 is designated a negative electrode side, and a direction perpendicular to the longitudinal direction is designated a lateral direction. In other words, lower section 30 extends in the longitudinal direction from one end at the negative electrode side toward the positive electrode side on mounting face 24, and the lower section 40 extends in the longitudinal direction from another end at the positive electrode side toward the negative electrode side on mounting face 24.

As shown in FIG. 1, end portions of negative terminal 20 and positive terminal 21 exposed from resin package 23 are bent upward at end edges of lower sections 30 and 40 along the end surfaces of solid electrolytic capacitor composed of resin package 23. Lower sections 30 and 40 and the end portions of positive terminal 21 and negative terminal 20 bent along the end surfaces are provided with plated layers for soldering to a circuit board.

Negative terminal 20 further includes mount portion 31 joined to the underside of negative electrode section 11 of element 10A via conductive bonding portion 22. Mount portion 31 is connected to an end of lower section 30 at the positive electrode side through negative electrode connection (hereafter referred to as "connection") 32, as shown in FIG. 1 and FIG. 2. That is, mount portion 31 is connected with one end of lower section 30 closer to positive terminal 21. Mount portion 31 and connection 32 are formed to have a same width with lower section 30.

Conductive bonding portion 22 contains a main ingredient of conductive filler such as silver and copper, and a binder of either thermosetting resin or thermoplastic resin such as epoxy resin, urethane resin, silicone resin, acrylic resin and polyimide resin. Conductive bonding portion 22 is thus formed of an electrically conductive paste having the conductive filler and the binder mixed with a solvent.

As described above, negative terminal 20 includes lower section 30, connection 32, and mount portion 31. Connection 32 is formed by being bent vertically or obliquely upward across the entire width at one end of lower section 30 at the positive electrode side, and embedded within resin package 23. Mount portion 31 is provided at an upper end of upwardly bent connection 32. A shape thus configured by the connected lower section 30 and mount portion 31 has a step-like shape.

Mount portion 31 is located closer to the positive electrode side than lower section 30, and resin package 23 is disposed under mount portion 31. In addition, an upper face of mount portion 31 is flat, and parallel to mounting face 24 with a predetermined spacing. It is preferable that the center of mount portion 31 is disposed closer to the negative electrode side than the center of negative electrode section 11 in the longitudinal direction.

As shown in FIG. 2 and FIG. 3A, negative terminal 20 further includes protruding portions 34 provided in a pair along two sides of mount portion 31. Protruding portions 34 protrude from side edges along the longitudinal direction of mount portion 31, and extend in the lateral direction in a same plane as mount portion 31. The width of each of protruding portions 34 is narrowed stepwise toward the protruding direction. In addition, each of protruding portions 34 is provided with collecting portion 60 on the underside of negative electrode section 11. Collecting portion 60 is formed of two side edges, a vertex where these side edges meet, and the electrically conductive paste stuck out from negative terminal 20. In other words, collecting portion 60 is disposed adjacent to the side edge of an area where protruding portion 34 is narrowed stepwise. Collecting portion 60 accommodates conductive bonding portion 25 which is a part of conductive bonding portion 22.

As described previously, conductive bonding portion 22 is disposed between the upper face of mount portion 31 and the underside of negative electrode 11 of the element 10A to join mount portion 31 and negative electrode 11. A part of conductive bonding portion 22 is also disposed on the upper face of protruding portion 34. Holder portion 33 is thus connected to negative electrode section 11 via conductive bonding portion 22 disposed between a side face of negative electrode section 11 and holder portion 33.

Conductive bonding portion 22 disposed on protruding portion 34 may be either continuous with or separated from conductive bonding portion 22 disposed on holder portion 33.

It is preferable that collecting portion 60 has at least first collecting portion 35 and second collecting portion 36, as shown in FIG. 3A. First collecting portion 35 is formed of side edge 31A of mount portion 31 and first side edge 61 of protruding portion 34 connected with side edge 31A, in a plan view. That is, first collecting portion 35 is a boundary between mount portion 31 and protruding portion 34. Second collecting portion 36 is formed of second side edge 62 and third side edge 63 that are parts of protruding portion 34 and connected with each other in the plan view.

When elements 10 are stacked on mount portion 31, the electrically conductive paste to form conductive bonding portion 22 is stuck out of mount portion 31 or protruding portion 34, and accommodated in collecting portion 60. Negative electrode section 11 and negative terminal 20 can be joined securely together and an ESR can be reduced by applying the electrically conductive paste of such an amount on mount portion 31 that the paste is stuck out of negative terminal 20.

The electrically conductive paste is applied on either the upper face of negative terminal 20 or the underside of negative electrode section 11 from mount portion 31 toward protruding portion 34 along about the longitudinal direction. Subsequently, elements 10 stacked on mount portion 31 are pressed at about the center part of negative electrode section 11 from the above. Elements 10 are tightly joined to mount portion 31 in this manner. During the application of a pressure, the electrically conductive paste is forced out of the side edge of protruding portion 34. An amount of the forced-out electrically conductive paste is therefore larger near mount portion 31, and the amount is even larger in the vicinity of the vertex where side edge 31A of mount portion 31 and first side edge 61 of protruding portion 34 meet. Collecting portion 60 thus provided can prevent conductive bonding portion 25 forced out of negative terminal 20 from becoming exposed outside of resin package 23.

As stated previously, since the electrically conductive paste tends to gather easily toward curved portion 35A of the vertex where the two side edges meet, conductive bonding portion 25 is formed thicker around curved portion 35A of first collecting portion 35.

Furthermore, the provision of second collecting portion 36 can reduce an amount of the electrically conductive paste that flows into first collecting portion 35 as compared with a case in which only first collecting portion 35 is provided. In other words, a part of conductive bonding portion 25 that cannot be accommodated in first collecting portion 35 can be accommodated in second collecting portion 36. Accordingly, conductive bonding portion 25 is also formed thicker around curved portion 36A of second collecting portion 36 since the electrically conductive paste tends to gather easily toward curved portion 36A at the vertex where second side edge 62 and third side edge 63 meet. It is hence possible to positively prevent conductive bonding portion 25 stuck out of negative terminal 20 from becoming exposed outside of resin package 23 by virtue of provided first collecting portion 35 and second collecting portion 36.

As shown in FIG. 3A, first collecting portion 35 and second collecting portion 36 are provided in a pair at both sides of protruding portion 34, respectively, and that protruding portion 34 has the width narrowed stepwise with increase in distance from mount portion 31. In each of first collecting portion 35 and second collecting portion 36, an angle at which the side edges intersect is approximately a right angle. As described, collecting portion 60 formed of first collecting portion 35 and second collecting portion 36 is preferably formed into a stepped shape. Collecting portion 60 formed into the stepped shape can help the electrically conductive paste to easily enter second collecting portion 36, and improve the effect of preventing conductive bonding portion 25 from being exposed from resin package 23. In a case where negative terminal 20 is provided with support portion 38 having upper section 39, as will be described later, this structure can prevent the electrically conductive paste squeezed into first collecting portion 35 from spreading over and reaching upper section 39 when conductive bonding portion 22 is formed on mount portion 31.

Inner radius of curvature R of curved portion 35A of first collecting portion 35 is preferably larger than an inner radius of curvature of curved portion 36A of second collecting portion 36. That is, a part where side edge 31A of mount portion 31 meets first side edge 61 in first collecting portion 35 has curved portion 35A defined as a first curved portion, and a part where second side edge 62 meets third side edge 63 in second collecting portion 36 has curved portion 36A defined as a second curved portion. In this case, the radius of curvature of the first curved portion is preferably larger than the radius of curvature of the second curved portion. This structure can reduce an amount of the electrically conductive paste pressed out into an area around the vertex of first collecting portion 35, and further decrease the thickness of conductive bonding portion 25 formed in curved portion 35A of first collecting portion 35. As a result, the structure can increase the effect of preventing conductive bonding portion 25 from being exposed outside of resin package 23.

Figure 3B:
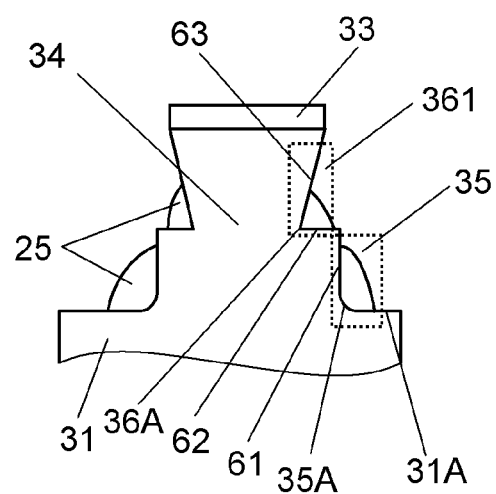
FIG. 3B is an enlarged plan view of a main portion that illustrates a conductive bonding portion accommodated in first and second collecting portions provided in another negative terminal of the solid electrolytic capacitor shown in FIG. 1.

Meanwhile, it may be appropriate to form second collecting portion 361 so that an angle at which second side edge 62 intersects third side edge 63 is an acute angle, as shown in FIG. 3B. FIG. 3B is an enlarged plan view of a main portion that illustrates conductive bonding portion 25 accommodated in first collecting portion 35 and second collecting portion 361 provided in another negative terminal of the solid electrolytic capacitor shown in FIG. 1. In first collecting portion 35, it is also appropriate that an angle at which side edge 31A intersects first side edge 61 is an acute angle. In other words, the inner angles of first collecting portion 35 and second collecting portion 36 (361) are either a right angle or an acute angle, or at least one of these inner angles may be an acute angle. It is preferable that the inner angle of second collecting portion 36 (361) is smaller than the inner angle of first collecting portion 35. That is, the angle formed between second side edge 62 and third side edge is preferably smaller than the angle formed between side edge 31A of mount portion 31 and first side edge 61. This is for the same reason as in the case where the radii of curvature are formed different relative to each other.

In FIG. 3A and FIG. 3B, stuck-out conductive bonding portions 25 are accommodated separately and formed in individual areas of first collecting portion 35 and one of second collecting portions 36 and 361. However, conductive bonding portion 25 may be formed into one piece by having it stuck out of the vertex where first side edge 61 meets second side edge 62.

Meanwhile, it is preferable to provide negative electrode holder portion (hereafter referred to as "holder portion") 33 at an end of each of protruding portions 34, as shown in FIG. 1, FIG. 2 and FIG. 4. Each of holder portions 33 is formed of a tip end of mount portion 31 which is bent about vertically upward. In other words, holder portions 33 extend from protruding portions 34 in a stacking direction of elements 10. It is also preferable to provide recessed portions 18 in negative electrode section 11, as shown in FIG. 2. Recessed portions 18 are provided in both sides of negative electrode section 11 at a distance away from an end of negative electrode section 11. Holder portions 33 are fitted in, and connected to recessed portions 18 of negative electrode section 11. Holder portions 33 connected to recessed portions 18 in this manner can increase a surface area of element 10 in portions other than recessed portions 18. As a result, this structure can increase the capacitance and decrease the ESR of the solid electrolytic capacitor.

In addition, negative terminal 20 preferably has support portions 38 which are in contact directly to the underside at an end side of negative electrode section 11 without conductive bonding portion 22 between negative electrode section 11 and each of support portions 38. As shown in FIG. 1, FIG. 2 and FIG. 5, each of support portions 38 is connected to a part of the side edge of lower section 30, and the shape of connected lower section 30 and support portion 38 configure a step. In other words, each of support portions 38 extends from the side edge of lower section 30. Support portions 38 provided in a pair on both side edges of lower section 30 are bent vertically or obliquely upward within resin package 23 from the side edges of lower section 30. There are also upper sections 39 provided at upper ends of support portions 38.

Upper faces of upper sections 39 of support portions 38 are formed approximately in parallel to mounting face 24 with spacing of a predetermined distance, and resin package 23 is disposed under upper sections 39, as shown in FIG. 5. Resin package 23 disposed under upper sections 39 can suppress deformation of lower section 30, and ensure the mountability.

Upper sections 39 are preferably bent to extend outward with respect to lower section 30 in the lateral direction so that upper sections 39 are formed outside of lower section 30. As a result, upper sections 39 are located outside of the side edges at the negative electrode side on mount portion 31 in the lateral direction, and the upper faces of upper sections 39 are located further away from the upper face of mount portion 31. This structure can prevent the electrically conductive paste from spreading over and reaching up to upper sections 39 when conductive bonding portion 22 is formed on mount portion 31, and positively keep upper sections 39 in a unfixed state. Note that "the edge at the negative electrode side on mount portion 31" described above means a bent portion at an upper end side of connection 32 shown in FIG. 1 and FIG. 2.

It is also preferable to dispose upper sections 39 such that the tip ends of upper sections 39 at the sides of negative electrode section 11 protrude outward beyond the side faces of negative electrode section 11, as shown in FIG. 5. Since resin package 23 covers a periphery of the tip ends of upper sections 39 in this structure, deformation of lower sections 30 can be prevented and the mountability is ensured. Note that upper sections 39 may be bent inward in the lateral direction such that they are located directly above the upper face of lower section 30.

The upper faces of upper sections 39 are preferably in contact directly with the underside, including the edges, of negative electrode section 11 of lowermost element 10A. It is also preferable that the upper faces of upper sections 39 are disposed approximately in the same plane as the upper face of mount portion 31, and have an area smaller than that of the upper face of mount portion 31. It is even more preferable that the upper faces of upper sections 39 are disposed higher than the upper face of mount portion 31 by a thickness of conductive bonding portion 22 disposed on mount portion 31.

Upper sections 39 and negative electrode 11 are movable with respect to each other when a shifting stress is exerted on any of upper sections 39 and negative electrode section 11 before element 10 is covered with resin package 23. In other words, upper sections 39 and negative electrode 11 are in an unfixed state. After element 10 is covered with resin package 23, support portions 38 and negative electrode 11 are secured by resin package 23 to become a fixed state that they are not movable with respect to each other.

As described, support portions 38 are preferably formed such that they are connected to the side portions of lower section 30, and come into contact with the underside at the end side of negative electrode section 11 without conductive bonding portion 22 therebetween. With this structure, it becomes possible to prevent negative electrode section 11 from tilting downward at one end during the assembling process of the solid electrolytic capacitor, and resin package 23 can reliably cover the end of negative electrode section 11. As a result, this structure can suppress increase in the ESR attributed to oxidative degradation of solid electrolyte layer 15 as well as increase in leakage current due to absorption of moisture by elements 10.

In the process of joining elements 10 to negative terminal 20 and positive terminal 21, and in the process of forming resin package 23, the end of negative electrode 11 is in the unfixed state with negative terminal 20. This can reduce a physical stress on negative electrode section 11 attributed to thermal expansion of negative terminal 20 and a processing variation in the lead frame, and suppress degradation in the leakage current.

Description is provided next about positive terminal 21. Positive terminal 21 has positive electrode connections (hereafter referred to as "connections") 41. Connections 41 are provided in a pair on both sides of lower section 40, such that they extend in the lateral direction from parts of the sides of lower section 40, and are bent vertically or obliquely upward within resin package 23 from the sides of lower section 40, as shown in FIG. 6. Each of connections 41 is further provided with setting portion 42. Setting portions 42 are disposed outside of the sides of lower section 40. Setting portions 42 are formed flat so as to support the underside of positive electrode section 12.

Additionally, each of connections 41 is provided with positive electrode holder portion (hereafter referred to as "holder portion") 43 that extends from setting portion 42, as shown in FIG. 1. Holder portions 43 are extended along the edge of stacked positive electrode sections 12, and bent at the upper face of positive electrode sections 12 in a manner to embrace stacked positive electrode sections 12. Then, holder portions 43 and the upper face of stacked positive electrode sections 12 are joined by laser welding or resistance welding.

In the above description, negative terminal 20 having first collecting portion 35 and second collecting portion 36 is exposed from mounting face 24 of resin package 23, and the edge is bent upward along resin package 23. However, the shape of negative terminal 20 is not limited to this. Lower section 30 needs not be bent upward along resin package 23 so long as it is exposed from mounting face 24. In the negative terminal exposed from the side face of the resin package and bent along the side face and the mounting face shown in FIG. 8, first collecting portion 35 and second collecting portion 36 may be provided in a portion where the negative electrode section of the capacitor element is mounted.

In the above-description, first collecting portion 35 is formed of side edge 31A of mount portion 31 and first side edge 61 of protruding portion 34, and second collecting portion 36 (361) is formed of second side edge 62 and third side edge 63, in a plan view. However, first collecting portion 35 and second collecting portion 36 (361) may be formed of side edges of continuously curved shape that protrudes toward the inside of protruding portion 34.

Next, description is provided of a method of manufacturing the solid electrolytic capacitor in an instance of using a plurality of elements 10 including element 10A, according to this embodiment of the present invention.

First, a lead frame of 0.1 mm to 0.2 mm in thickness and having negative terminal 20 and positive terminal 21 formed into one piece is prepared, and element 10A is placed on upper sections 39 and mount portion 31 of negative terminal 20, and setting portions 42 of positive terminal 21.

When element 10A is placed, the electrically conductive paste that becomes conductive bonding portion 22 is applied to mount portion 31 and protruding portions 34 on which negative electrode section 11 is to be positioned, and negative electrode section 11 of element 10A is stacked on upper sections 39 and mount portion 31. Alternatively, the electrically conductive paste may be applied to areas of negative electrode section 11 that are to be positioned and stacked on mount portion 31 and protruding portions 34, or the electrically conductive paste may be applied to both sides.

Following the above, another element 10 is applied with the electrically conductive paste and stacked on element 10A, and other elements 10 are applied with the electrically conductive paste and stacked one after another successively. Stacked elements 10 are then applied with a pressure to spread and sandwich the electrically conductive paste between negative electrode section 11 and mount portion 31, between negative electrode section 11 and protruding portions 34, between negative electrode section 11 and another negative electrode section 11, and between negative electrode section 11 and holder portions 33. Due to the application of this pressure, the electrically conductive paste is stuck out and accommodated in first collecting portion 35 and second collecting portion 36. Thereafter, the electrically conductive paste is hardened at a high temperature between 110° C. and 200° C. to form conductive bonding portions 22 and 25.

On the other hand, the edges of holder portions 43 are bent and brought into contact to stacked positive electrode sections 12. A beam of laser is then irradiated from the upper side of the edges of holder portions 43 to weld between positive electrode sections 12 and positive terminal 21 as well as between stacked positive electrode sections 12.

Subsequently, elements 10 bonded to negative terminal 20 and positive terminal 21, mount portion 31, connection 32, support portions 38, and connection 41 are covered with the heat-resistant insulation resin such as epoxy resin by means of transfer molding. In this process, the undersides of lower sections 30 and 40 are exposed on mounting face 24. Resin package 23 is thus formed. Next, negative terminal 20 and positive terminal 21 are cut off from the lead frame in a manner that the tip portions of negative terminal 20 and positive terminal 21 are protruded from the ends of resin package 23 in the same plane as mounting face 24. The tip portions of negative terminal 20 and positive terminal 21 are then bent along the end faces of resin package 23. The solid electrolytic capacitor shown in FIG. 1 and FIG. 2 is hence completed as a result of the above processes.

INDUSTRIAL APPLICABILITY

The solid electrolytic capacitor of the present invention can prevent the conductive bonding portion from being exposed while having a large capacitance. This structure is useful for solid electrolytic capacitors that have outside terminals connected with capacitor elements.

The invention claimed is:
1. A solid electrolytic capacitor comprising:
  a capacitor element including a positive electrode and a negative electrode;
  a negative terminal joined to the negative electrode;
  a positive terminal joined to the positive electrode; and
  a resin package covering the capacitor element,
  wherein the negative terminal includes:
    a mount portion above which the negative electrode is disposed;
    a first protruding portion protruding from a side edge of the mount portion in a same plane as the mount portion; and
    a second protruding portion protruding from a side edge of the first protruding portion in a same plane as the first protruding portion, and
  upper faces of the mount portion, the first protruding portion and the second protruding portion are joined to an underside of the negative electrode via a conductive bonding member,
  the first protruding portion has a first side edge and a second side edge,
  the second protruding portion has a third side edge,
  the first side edge or its extension intersects with the side edge or its extension of the mount portion,
  the second side edge or its extension intersects with the first side edge or its extension,
  the third side edge or its extension intersects with the second side edge or its extension,
  the side edge of the mount portion is connected with the first side edge through a first curved edge,
  the second side edge is connected with the third side edge through a second curved edge, and
  a radius of curvature of the first curved edge is larger than a radius of curvature of the second curved edge.

2. A solid electrolytic capacitor comprising:
a capacitor element including a positive electrode and a negative electrode;
a negative terminal joined to the negative electrode;
a positive terminal joined to the positive electrode; and
a resin package covering the capacitor element,
wherein the negative terminal includes:
- a mount portion above which the negative electrode is disposed;
- a first protruding portion protruding from a side edge of the mount portion in a same plane as the mount portion; and
- a second protruding portion protruding from a side edge of the first protruding portion in a same plane as the first protruding portion, and upper faces of the mount portion, the first protruding portion and the second protruding portion are joined to an underside of the negative electrode via a conductive bonding member, an angle at an intersection of the side edge or its extension of the mount portion and the first side edge or its extension is either a right angle or an acute angle, an angle at an intersection of the second side edge or its extension and the third side edge or its extension is either a right angle or an acute angle, and the angle at an intersection of the second side edge or its extension and the third side edge or its extension is smaller than the angle of the intersection of the side edge or its extension of the mount portion and the first side edge or its extension.

* * * * *